UNITED STATES PATENT OFFICE.

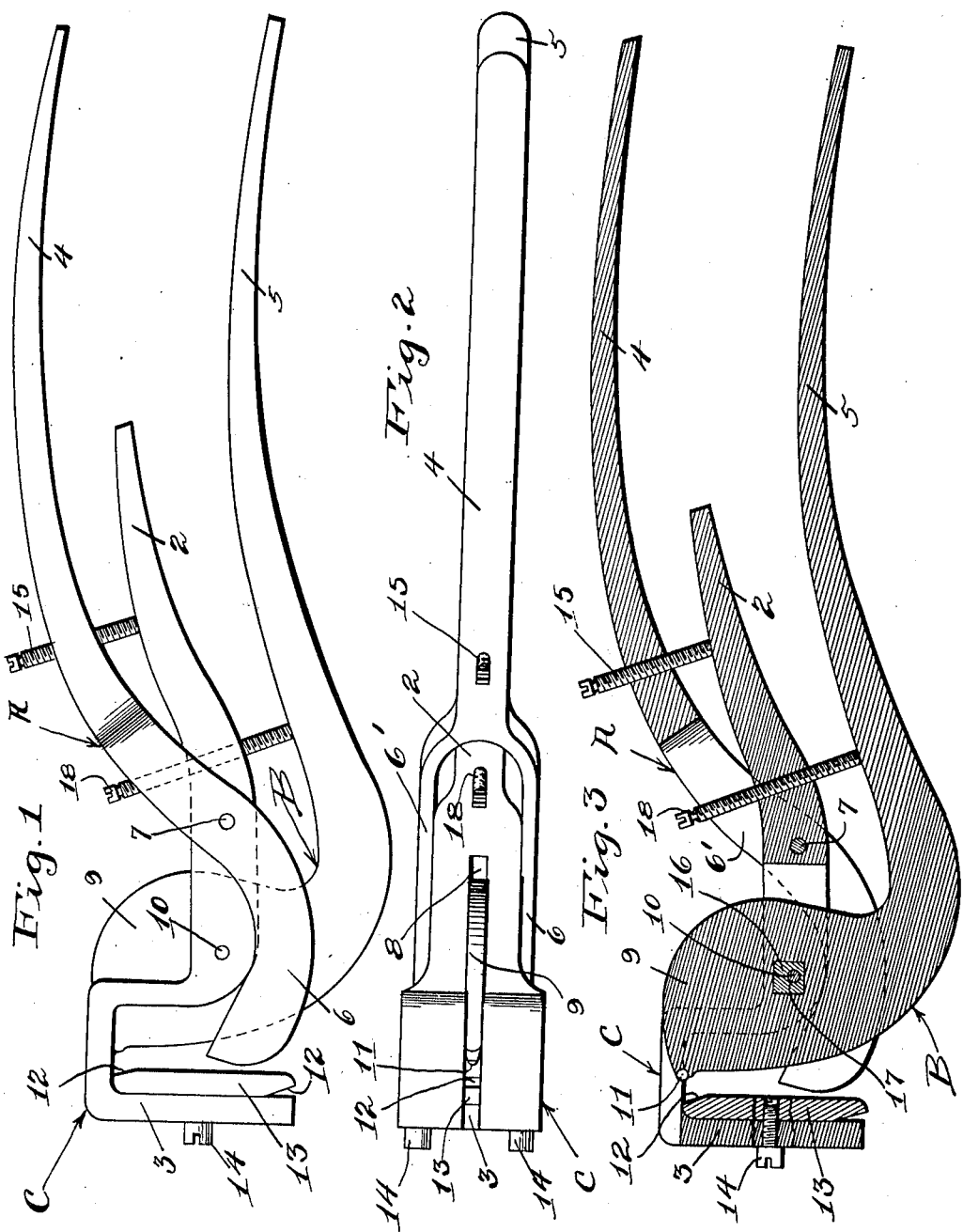

GEORGE A. MORRIS, OF INVER GROVE, MINNESOTA.

SAW-SET.

1,019,824.   Specification of Letters Patent.   Patented Mar. 12, 1912.

Application filed August 14, 1911. Serial No. 643,912.

*To all whom it may concern:*

Be it known that I, GEORGE A. MORRIS, a citizen of the United States, residing at Inver Grove, in the county of Dakota and State of Minnesota, have invented new and useful Improvements in Saw-Sets, of which the following is a specification.

My invention relates to improvements in saw sets. Its object is to provide an implement of this class adapted for use in setting saws of divers forms and varying thickness of blade and fineness of tooth.

My invention is illustrated in the accompanying drawings, in which—

Figure 1 is an elevation of my saw set; Fig. 2 is a plan of the same and Fig. 3 is a central longitudinal section of Fig. 1.

The implement comprises a guide lever A, a set lever B and the member C which consists of the shank 2 and retaining head 3 adapted to receive the blade of the saw to be set.

The outer ends of the guide lever A and set lever B form the handles 4 and 5 respectively. The inner end of the lever A is bifurcated and its branches 6 and 6' are perforated to receive the pintle 7 which is journaled in the shank 2. The member C is formed with the longitudinal slot 8 through which the head 9 of the set lever B passes and in which said lever is journaled by the pin 10. The head 9 of the set lever B terminates in the ball point 11 which is adapted to impinge against a saw tooth and bend it against the end 12 of the bearing plate 13. This plate is removably and reversibly connected within the retaining head 3 by means of the screws 14. I prefer to bevel the ends of this plate as shown, one at a greater angle than the other, and either end of the plate may be placed beneath the ball point 11. The implement may also be provided with a number of these plates having bearing surfaces of different lengths to accommodate saws of different degrees of fineness. The saw blade is inserted between the bearing plate 13 and the branches 6—6' of the guide lever A with the tooth beneath the ball point 11 of the set lever B. To prevent binding of the saw and permit it to slide between the bearing plate and the guide lever, I insert the set screw 15 in said lever with its end impinging against the shank 2 of the member C. By setting this screw the space between the bearing plate 13 and the branches 6—6' of the guide lever A may be varied to freely admit saw blades of different thickness.

To adapt the tool to properly bend teeth of different degrees of fineness it is necessary to provide an adjustable fulcrum point for the set lever B so that its ball point 11 may strike the saw tooth at a proper distance from its base and thereby secure suitable coaction with the end of the bearing plate 13. To accomplish this, a socket is formed in the lever B in which a removable and reversible journal block 16 is placed. This block is provided with a journal bearing 17 for the hereinbefore mentioned pin 10, said bearing being placed at an unequal distance from each of the corners of the journal block 16 so that to remove this block from said aperture and replace it after either turning it or reversing its ends will change the fulcrum point and stroke of the set lever B. Such change of position of the journal block will of course shift the point of application of the clamping pressure of the ball point 11 on the end of the bearing plate 13.

To prevent undue pressure of the ball point upon the saw tooth I have provided a set screw 18 which is threaded in the shank 2 with its end impinging against the set lever B. By manipulating this set screw the inward movement of the set lever B may be limited and the pressure of the ball point controlled.

In use, the bearing plate 13, with a suitable bevel at its upper end, is attached in the retaining head 3 and the set screw 15 is adjusted so that when the guide lever A is depressed the space between its branches 6—6' and the bearing plate 13 will form a guide through which the blade of the particular saw to be set may slide with its teeth beneath the ball point 11. The journal block 16 is then adjusted in its socket to permit the proper stroke of the set lever B for the teeth of such saw and the set screw 18 is also adjusted to fit said teeth. The blade of the saw may then be passed through the guide head and one tooth after another set by pressure on the handles 4 and 5.

Having described my invention, what I claim as new and desire to protect by Letters Patent, is:

1. A saw set comprising a set lever, a guide lever and a guide head provided with a shank to which said levers are pivotally connected, a reversible bearing plate in said head, means for changing the fulcrum point of the set lever and means for limiting the movement of the guide lever.

2. A saw set comprising a set lever, a guide lever, a guide head provided with a shank to which said levers are pivotally connected, a bearing plate in said head, a reversible journal block in said set lever, and means for limiting the movement of said levers.

3. In a device of the class described, a set lever, a guide lever and a guide head provided with a shank to which said levers are pivotally connected, a removable bearing plate for said head and an adjustable journal block in said set lever, whereby the point of application of pressure by said set lever against said plate may be varied with respect to the work.

4. A saw set comprising a set lever provided with a socket, a guide head having a shank to which said lever is pivotally connected, fulcrum changing means adapted to fit in said socket, a reversible bearing plate in said head having differently shaped faces adapted to be brought into coöperation with the fulcrum changing means, and guiding means adapted to hold a saw against said bearing plate.

5. A saw set comprising a set lever provided with a socket, a guide head having a shank to which said lever is pivotally connected, fulcrum-changing means adapted to fit in said socket, a reversible bearing plate in said head adapted to be brought into coöperation with the fulcrum-changing means and guiding means adapted to hold a saw against said bearing plate.

6. A saw set comprising a guide head having a shank, guiding means pivotally supported on said shank for retaining the blade of a saw in said head and setting means mounted on the shank for bending the teeth of the saw, said guiding and setting means being capable of adjustment for use in connection with a variety of saw blades.

7. A saw set comprising a set lever, a guide lever and a guide head provided with a shank to which said levers are pivotally connected and means for changing the fulcrum point of the set lever.

In testimony whereof, I have signed my name to this specification in the presence of two subscribing witnesses.

GEORGE A. MORRIS.

Witnesses:
WILLIS C. OTIS,
FRED. C. CASWELL.

---

Copies of this patent may be obtained for five cents each, by addressing the "Commissioner of Patents, Washington, D. C."